(12) United States Patent
Maskaliunas et al.

(10) Patent No.: US 8,534,674 B2
(45) Date of Patent: Sep. 17, 2013

(54) UNITIZED RADIAL FLUID SEAL

(75) Inventors: Linas L. Maskaliunas, Geneva, IL (US); Bret Thomas Dana, Harvard, IL (US)

(73) Assignee: Aktiebolaget SKF, Gothenburg (SE)

( * ) Notice: Subject to any disclaimer, the term of this patent is extended or adjusted under 35 U.S.C. 154(b) by 480 days.

(21) Appl. No.: 12/951,956

(22) Filed: Nov. 22, 2010

(65) Prior Publication Data

US 2012/0126490 A1 May 24, 2012

(51) Int. Cl.
*F16J 15/32* (2006.01)

(52) U.S. Cl.
USPC .......................................................... 277/551

(58) Field of Classification Search
USPC .................................. 277/549, 551, 571, 572
See application file for complete search history.

(56) References Cited

U.S. PATENT DOCUMENTS

| | | | |
|---|---|---|---|
| 3,838,862 A | 10/1974 | Fern | |
| 4,037,849 A | 7/1977 | Thumm | |
| 4,283,063 A * | 8/1981 | Prescott | 277/353 |
| 4,448,426 A | 5/1984 | Jackowski et al. | |
| 4,531,748 A | 7/1985 | Jackowski | |
| 4,822,055 A * | 4/1989 | Hogan | 277/558 |
| 5,186,472 A | 2/1993 | Romero et al. | |
| 5,350,181 A * | 9/1994 | Horve | 277/559 |
| 6,186,507 B1 | 2/2001 | Oldenburg | |
| 6,471,211 B1 | 10/2002 | Garnett et al. | |
| 6,692,007 B2 | 2/2004 | Oldenburg | |
| 7,959,158 B2 * | 6/2011 | Sanada | 277/551 |
| 2009/0108539 A1 * | 4/2009 | Forti et al. | 277/553 |

* cited by examiner

*Primary Examiner* — Vishal Patel
(74) *Attorney, Agent, or Firm* — J-TEK Law PLLC; SKF USA Inc. Patent Group

(57) ABSTRACT

A unitized radial fluid seal includes a shell having a first elastomeric seal body affixed thereto and defining a primary seal lip. A sleeve includes a substantially cylindrical, axially-extending sealing flange and a protective flange extending substantially radially from the axially-extending sealing flange. A spring radially urges the primary seal lip into sealing contact with a sealing surface of the axially-extending sealing flange. A second elastomeric seal body is affixed to the sleeve and includes a resiliently-elastic angled lip extending from a terminal end of the axially-extending sealing flange opposite of the radially-extending protective flange. The sealing surface and an axially-outward facing surface of the angled lip define an angle ($\alpha$) that is between about 130-170°. The primary seal lip is axially retained between the angled lip and the radially-extending protective flange.

10 Claims, 2 Drawing Sheets

UNITIZED RADIAL FLUID SEAL

TECHNICAL FIELD

The present invention generally relates to a unitized radial fluid seal, preferably for retaining lubricant in and around a bearing, such as a wheel bearing for a truck or other heavy-duty commercial vehicle.

KNOWN ART

Unitized radial shaft seals are utilized in the vehicle field to protect wheel bearings by providing a barrier between a rotatable wheel hub and a stationary wheel spindle or shaft. Such wheel bearings require continuous lubrication to reduce friction during operation.

The Scotseal® PlusXL wheel shaft seal, available from SKF USA, Inc. for several years, has been successfully employed as a unitized radial fluid seal for heavy duty applications, such as trucks and buses. In addition to retaining lubricant around the wheel bearings, it also effectively prevents contamination, such as dirt and water, from reaching the wheel bearings.

An example of the known Scotseal® PlusXL is shown in FIG. 1 and it includes two basic annular components, the outer shell or case 1 and the inner shell or sleeve 20.

The outer shell 1 includes a substantially L-shaped metal reinforcement 2 and an elastomeric sealing element 3 made of a hydrogenated nitrile butadiene rubber. The elastomeric sealing element 3 includes a primary seal lip 4, a radial dust/dirt lip 5, an annular dust/dirt lip 6 and an outer bump lip 7, all of which are elastic and contact a surface of the metal sleeve 20 during operation. The primary seal lip 4 serves to retain the lubricant around the wheel bearings and the other three lips 5, 6 and 7 serve to prevent contamination from entering into the lubrication chamber (sealed region). A plurality of annular beads 8 are defined on the outside diameter (outside circumferential surface) of the elastomeric sealing element 3 for sealingly abutting against an adjacent surface of the wheel hub.

A garter (annular coiled wire) spring 9 serves to radially-inwardly bias or load the primary seal lip 4 into sealing contact with the metal sleeve 20.

An elastomeric seal 21 is affixed to the substantially L-shaped metal sleeve 20 and is comprised of a blend of nitrile rubber and ethylene propylene diene monomer rubber (EPDM rubber). A plurality of annular beads 22 are defined on the inside diameter (inside circumferential surface) of the elastomeric seal 21 for sealingly abutting against a facing surface of the wheel spindle. A metal curl 23 extends from the terminal end of the sleeve 20 that is closest to the wheel bearings and serves as a collar or rim to retain the outer shell 1 in a unitized manner with the sleeve 20. Further teachings concerning the curl 23 may be found in U.S. Pat. No. 4,531,748.

The primary seal lip 4 has a Wave® seal lip construction, which reduces friction and thus heat generation while also serving to pump the lubricant back towards the wheel bearings and push dirt away from the lubrication chamber. For this purpose, the primary seal lip is a smooth lip, bi-rotational hydrodynamic radial lip seal formed in a sinusoidal or wave pattern. This design also reduces shaft wear and increases service life, while not losing pumping power as it wears.

In addition, U.S. Pat. No. 5,186,472 discloses a unitized radial shaft seal that includes a cylindrical outer covering or case made of sheet steel (shell) having an elastomeric outer ring affixed thereto for sealing against a housing bore. An elastomeric seal lip extends from the shell and provides a dynamic and static seal against the inner casing or sleeve. A garter spring is provided to elastically urge or bias the seal lip into sealing contact with the opposing surface. The inner casing or sleeve is mounted on the rotary shaft and includes a radially-extending portion that curls around the seal lip.

Other unitized fluid seals are disclosed in U.S. Pat. Nos. 6,471,211 and 4,448,426.

SUMMARY

While the unitized fluid seal 1 shown in FIG. 1 has been very successful, two disadvantages have been identified.

First, during installation, maintenance or removal of the fluid seal 1 of FIG. 1, the metal curl 23 can come into contact with the sealing lip 4, thereby compromising or damaging the functional integrity of the sealing lip 4. This damage may lead to premature failure of the fluid seal 1 or may limit the opportunity to identify the root cause of the seal failure for a fluid seal known to be at the end of its service life.

Second, the fluid seal 1 of FIG. 1 is typically manufactured by placing the outer shell 1 adjacent to the sleeve 20 and then radially-outwardly curling the terminal end (skirt portion) of the sleeve 20 using a closing die in order to form the curl 23 and thereby retain the outer shell 1 between the curl 23 and the radially-extending flange of the sleeve 20. Thus, an extra manufacturing step is required to unitize the outer shell 1 and sleeve 20 and moreover, a sharp edge may be formed on the curl 23 by the closing die. The sharp edge on the curl 23 will likely cause damage to the relatively soft sealing lip 4 if the two parts come into contact.

Therefore, it is an object of the present teachings to provide an improved unitized radial fluid seal, which preferably overcomes one or more problems of the known art.

In a first aspect of the present teachings, a unitized radial fluid seal may include a shell comprising a substantially cylindrical, axially-extending first flange and a second flange extending substantially radially from the axially-extending first flange. A first elastomeric seal body may be affixed to the shell and may comprise a circumferentially-extending primary seal lip, e.g., an annular lip seal or a sinusoidal or wave-like lip seal. A sleeve may comprise a substantially cylindrical, axially-extending sealing flange and a protective flange extending substantially radially from the axially-extending sealing flange. A spring may radially urge the primary seal lip into sealing contact with a sealing surface of the axially-extending sealing flange. A second elastomeric seal body may be affixed to the sleeve and may include a resiliently-elastic angled lip extending from a terminal end of the axially-extending sealing flange opposite of the radially-extending protective flange. A first angle (α) defined by the sealing surface and an axially-outward facing surface of the angled lip is preferably between about 130-170° and the primary seal lip is axially retained between the angled lip and the radially-extending protective flange.

In a further aspect of the present teachings, the first angle (α) is preferably between about 140-180° or more preferably between about 155-165°. An angled lip according to these aspects of the present teachings provide an advantageous balance between axial retention of the primary seal lip and prevention of damage to the primary seal lip during installation, maintenance or removal of the unitized radial fluid seal.

In addition or in the alternative, an axially-inward facing surface may be defined on the angled lip and a second angle (β) defined by the axially-inward facing surface of the angled lip and the radial direction is preferably between about 40-80°, more preferably between about 50-70°, even more preferably between about 55-65°.

In addition or in the alternative, a radially-inward, angled surface may be defined on the angled lip and a third angle (γ) defined by the radially-inward, angled surface and the axial direction is preferably between about 20-60°, more preferably between about 25-45°, more preferably between about 30-35°.

In addition or in the alternative, the spring may be an annular coiled wire spring, e.g., a garter spring.

In addition or in the alternative, the first elastomeric seal body may further include one or more of an annular dust seal, a radial dust seal and an outer bump seal, each contacting the sleeve.

In addition or in the alternative, the first elastomeric seal body may further include an outside diameter mounting portion defining a plurality of annular beads and/or the second elastomeric seal body may further include an inside diameter mounting portion defining a plurality of annular beads.

Further features, objects and advantages of the present teachings will become apparent after reading the following detailed description and claims in view of the appended drawings.

DETAILED DESCRIPTION OF THE INVENTION

The representative fluid seal disclosed below includes a sleeve configured to be mounted or seated on a shaft or other cylindrical machine part and a primary sealing lip is disposed radially outwardly thereof. However, it should be understood that the present teachings apply equally to fluid seals wherein these parts are reversed. In such case, the seal band of the primary seal unit may be urged radially outwardly against a seal companion flange or unitizing element which is disposed radially outwardly of the primary seal.

Furthermore, it should also be understood that various elastomers are useful in making the present fluid seal, including elastomers, fluorocarbons or other lubricous resinous materials. Thus, the present teachings are not intended to be limited to the use of any particular material, except insofar as such material would not be suitable for use in a fluid seal of the type encompassed by the present teachings.

As used in the present description, the expression "assembled", or words of similar meaning, should be understood to be synonymous with "unitized" as meaning a seal having two elements which are, after assembly, held or retained together for cooperative sealing action. In such a seal, the entire assembly includes two major or primary parts which rotate relative to each other, with a primary seal band area being formed as a seal lip or the like on one part, and a sleeve surface being formed on the other part. In other instances, not dealt with here, the expression "assembled" is sometimes understood to mean seals in which the primary seal element itself, i.e. an element containing both a casing and a body having a primary seal band thereon, are assembled by clamping, clinching, or the like rather than bonding. In the present description, the expression "assembled" is to be understood as being synonymous with unitizing and not as implying that the attachment of the primary seal body to its associated mounting flange is done by crimping or clamping.

Figure 1:
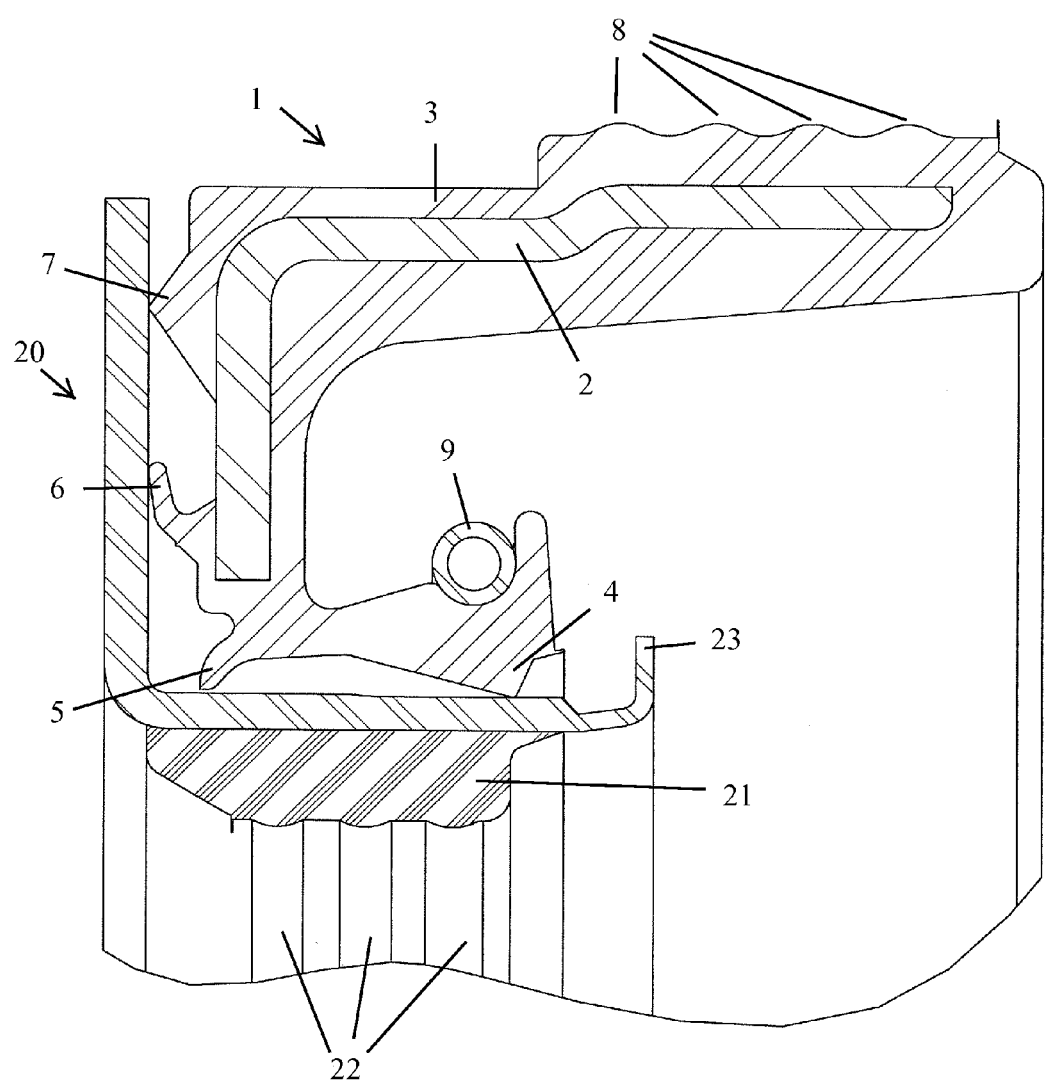
FIG. 1 shows a known unitized fluid seal.
Figure 2:
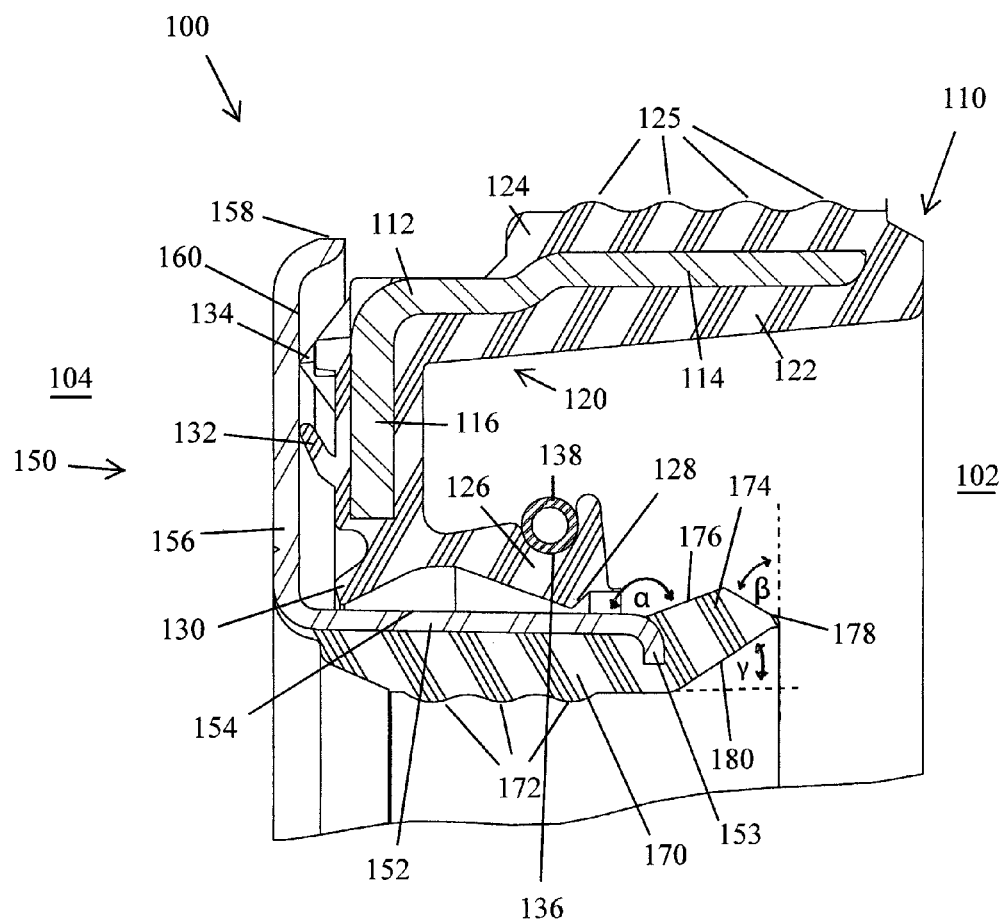
FIG. 2 shows a unitized fluid seal according to the present teachings.

Referring now to FIG. 2, a representative unitized radial fluid seal is shown and denoted as a whole with 100. Such a fluid seal 100 may be installed within a machine assembly in order to seal an opening between rotating and non-rotating structures, e.g., to seal a lubricant around a bearing. In a particularly preferred application of the present teachings, the seal 100 is disposed between a wheel spindle and a wheel hub of a vehicle, such as a truck, bus or other heavy-duty commercial vehicle, although the present teachings are certainly not limited to such applications.

The seal 100 includes two principal components, namely a seal element generally designated with 110 and a sleeve element generally designated with 150.

The seal element 110 includes an outer shell or case 112 having an axially-extending, substantially-cylindrical mounting flange 114 and a radially-inward extending flange 116. The outer shell 112 is preferably made of a rigid, durable material, such as steel or another metallic material. However, hard plastics also may be employed to form the outer shell 112.

According to conventional terminology, the side of the seal 100 lying to the right in FIG. 2 is known as the "fluid side" of the seal 100, whereas the portion of the seal lying to the left is referred to as the "air side". Accordingly, in FIG. 2 the region indicated by 102 is the enclosed or sealed region, while the region indicated by 104 lies outside the sealed region. Consequently, as used herein, the expression "axially inner" means toward the fluid side 102 of the seal 100 or toward the interior of the sealed region, whereas "axially outer" refers to the portion 104 of the seal 100 directed or lying toward the exterior of the sealed region.

The outer shell 112 is at least partially embedded in an elastomeric seal body generally designated with 120. The seal body 120 includes inner portion 122 disposed on the radially-inward side of the outer shell 112 and an exterior, mounting portion 124. A radial force-applying primary seal body 126 extends from the inner portion 122 and includes a primary seal lip or ring 128. In the annular or circumferential direction of the seal body 126, the primary seal lip 128 may extend either in a circular manner or in a sinusoidal (or wave-like) manner.

The entire elastomeric seal body 120 may preferably be integrally formed from a single elastomeric material, such as e.g., nitrile butadiene rubber (NBR) or hydrogenated nitrile butadiene rubber (HNBR). In the alternative, the elastomeric seal body 120 may be a composite component with two portions formed from different materials. The skilled person will recognize that a wide variety of elastomeric materials, such as unsaturated and saturated rubbers, may be used in accordance with the present teachings, as well as fluorocarbon materials such as polytetrafluoroethylene. Blended sealing materials known in the art also may be utilized to form the seal body 120 in whole or at least in part.

The elastomeric seal body 120 may completely surround or encapsulate the outer shell 112 or one or more portions of the outer shell 112 may be exposed.

A plurality of annular mounting ribs or beads 125 preferably extend circumferentially around the elastomeric mounting portion 124 and serve to sealingly abut an adjacent machine part, such as a surface of a wheel hub.

An annular dirt/dust lip 130, a radial dirt/dust lip 132 and an outer bump lip 134 are also defined on the elastomeric seal body 120 and serve to prevent ingress of contamination from the exterior, air side 104 into the fluid side 102 or sealed region.

An annular spring groove 136 is defined in the primary seal body 126 and accommodates an annular coiled wire (garter)

spring 138, which applies a radially-inward directed force to urge the primary seal lip 128 into annular contact with the adjacent radially-outward surface 154 of the sleeve 150.

The sleeve 150 is preferably comprised of a durable, rigid material, such as steel or another metallic material, although again durable, rigid plastics may be used in certain applications. The sleeve 150 includes a central, generally cylindrical, axially-extending sleeve portion 152 having a radially-outwardly directed primary sealing surface 154 designed to contact the primary seal lip 128 and the annular dirt lip 130 during operation of the fluid seal 100.

The axially outermost portion of the sleeve 150 includes a radially-outwardly extending protective flange 156 having an end portion 158 with an outside diameter that is slightly less than the outside diameter of the elastomeric mounting portion 124. In use, the radial dirt lip 132 and outer bump lip 134 are designed to contact a radially-extending surface 160 and thereby serve as the first barrier to prevent ingress of dirt, water or other types of contamination from the air side 104.

An inner seal body 170 is fixedly attached to the radially-inward side of the sleeve 150 and includes a plurality of annular mounting ribs or beads 172 for sealingly abutting on a machine part, such as a wheel spindle.

The inner seal body 170 further includes an over-molded portion or angled lip 174, which extends from the terminal end of the sleeve 150 generally in the axial direction towards the fluid side 102. The inner seal body 170 and angled lip 174 encompass an embedded flange or radially-inward directed curl 153 defined on the sleeve 150.

An axially-outward facing surface 176 of the lip 174 extends from the curl 153 at an angle ($\alpha$) to the primary sealing surface 154 of between about 130-170°, more preferably between about 140-180° and most preferably about 155-165°. An axially-inward facing surface 178 of the angled lip 174 preferably extends at an angle ($\beta$) to the radial direction (indicated by the vertical dot-dash line) of between about 40-80°, more preferably between about 50-70° and most preferably between about 55-65°. A radially-inward, angled surface 180 preferably extends at an angle ($\gamma$) to the axial direction (indicated by the horizontal dashed line) of between about 20-60°, more preferably between about 25-45° and most preferably between about 30-35°.

The angled lip 174 preferably has a thickness in the radial direction of about 2-4 mm, although the thickness will depend upon the particular application and the overall size of the fluid seal 100.

The inner seal body 170 may be made of a variety of elastomeric materials, such as unsaturated rubbers, e.g., nitrile rubber (NBR), and saturated rubbers, e.g., ethylene propylene diene monomer (EPDM) rubber, or blends thereof.

The angled lip 174 is preferably constructed such that it is elastically and resiliently flexible and provides a semi-unitizing feature. That is, the angled lip 174 at least partially functions to retain the sealing element 110 in the axial direction between the flange 156 and the angled lip 174 during storage and operation, thereby providing a unitized fluid seal 100. However, the angled lip 174 also allows the unitized fluid seal 100 to be assembled during manufacture by pushing the sealing element 110 over the angled lip 174 in the axial direction without damaging the primary seal lip 128 or more generally the primary seal body 126.

Furthermore, even in the event that the primary seal body 126 or the primary seal lip 128 comes into contact with the angled lip 174 during installation, maintenance or removal of the fluid seal 100, the primary seal body 126 or the primary seal lip 128 will not be damaged, thereby protecting the integrity of the primary seal body 126 and the primary seal lip 128.

A representative, non-limiting example of the present invention was described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved unitized fluid seals and methods for manufacturing the same.

Moreover, combinations of features and steps disclosed in the above detail description may not be necessary to practice the invention in the broadest sense, and are instead taught merely to particularly describe a representative example of the invention. Furthermore, various features of the above-described representative example, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Outer shell
2 Metal reinforcement
3 Elastomeric sealing element
4 Primary seal lip
5 Radial dirt lip
6 Annular dirt lip
7 Outer bump lip
8 Annular beads
9 Garter spring
20 Metal sleeve
21 Elastomeric seal
22 Annular beads
23 Metal curl
100 Unitized fluid seal
102 Fluid side
104 Air side
110 Seal element
112 Outer shell
114 Axially-extending flange
116 Radially-extending flange
120 Elastomeric seal body
122 Inner portion
124 Exterior, mounting portion
125 Outer annular beads
126 Primary seal body
128 Primary seal lip
130 Annular dirt lip
132 Radial dirt lip
134 Outer bump lip
136 Spring groove
138 Garter spring 150 Sleeve
152 Axially-extending portion
153 Curl
154 Primary sealing surface
156 Protective flange
158 End portion
160 Radially-extending surface
170 Inner seal body
172 Inner annular beads
174 Angled lip
176 Axially-outward facing surface
178 Axially-inward facing surface
180 Radially-inward, angled surface

The invention claimed is:

1. A unitized radial fluid seal including:
a shell comprising a substantially cylindrical, axially-extending first flange and a second flange extending substantially radially from the axially-extending first flange,
a first elastomeric seal body affixed to the shell and comprising a radially-extending primary seal lip,
a sleeve comprising a substantially cylindrical, axially-extending sealing flange and a protective flange extending substantially radially from the axially-extending sealing flange,
a spring radially urging the primary seal lip into sealing contact with a sealing surface of the axially-extending sealing flange, and
a second elastomeric seal body affixed to the sleeve and including a resiliently-elastic angled lip extending from a terminal end of the axially-extending sealing flange opposite of the radially-extending protective flange,
wherein a first angle ($\alpha$) defined by the sealing surface and an axially-outward facing surface of the angled lip extending from the sealing surface is between about 140-165° and the primary seal lip is axially retained between the angled lip and the radially-extending protective flange,
an axially-inward facing surface is defined on the angled lip extending from an end of the axially-outward facing surface and a second angle ($\beta$) defined by the axially-inward facing surface of the angled lip and the radial direction is between about 50-70°, and
a radially-inward, angled surface is defined on the angled lip extending from an end of the axially-inward facing surface and a third angle ($\gamma$) defined by the radially-inward, angled surface and the axial direction is between about 20-60°.

2. A unitized fluid seal according to claim 1, wherein the first angle ($\alpha$) is between about 155-165°.

3. A unitized fluid seal according to claim 2, wherein the second angle ($\beta$) is between about 55-65°.

4. A unitized fluid seal according to claim 3, wherein the third angle ($\gamma$) is between about 25-45°.

5. A unitized fluid seal according to claim 4, wherein the third angle ($\gamma$) is between about 30-35°.

6. A unitized fluid seal according to claim 5, wherein the spring is an annular coiled wire spring and the first elastomeric seal body further includes an annular dust seal, a radial dust seal and an outer bump seal, each contacting the sleeve.

7. A unitized fluid seal according to claim 6, wherein the first elastomeric seal body further includes an outside diameter mounting portion defining a plurality of annular beads and the second elastomeric seal body further includes an inside diameter mounting portion defining a plurality of annular beads.

8. A unitized fluid seal according to claim 1, wherein the second angle ($\beta$) is between about 55-65°.

9. A unitized fluid seal according to claim 1, wherein the third angle ($\gamma$) is between about 25-45°.

10. A unitized fluid seal according to claim 9, wherein the third angle ($\gamma$) is between about 30-35°.

* * * * *